No. 668,369. Patented Feb. 19, 1901.
W. H. BECKWITH.
HAY LOADER.
(Application filed Apr. 30, 1900.)
(No Model.) 3 Sheets—Sheet 2.
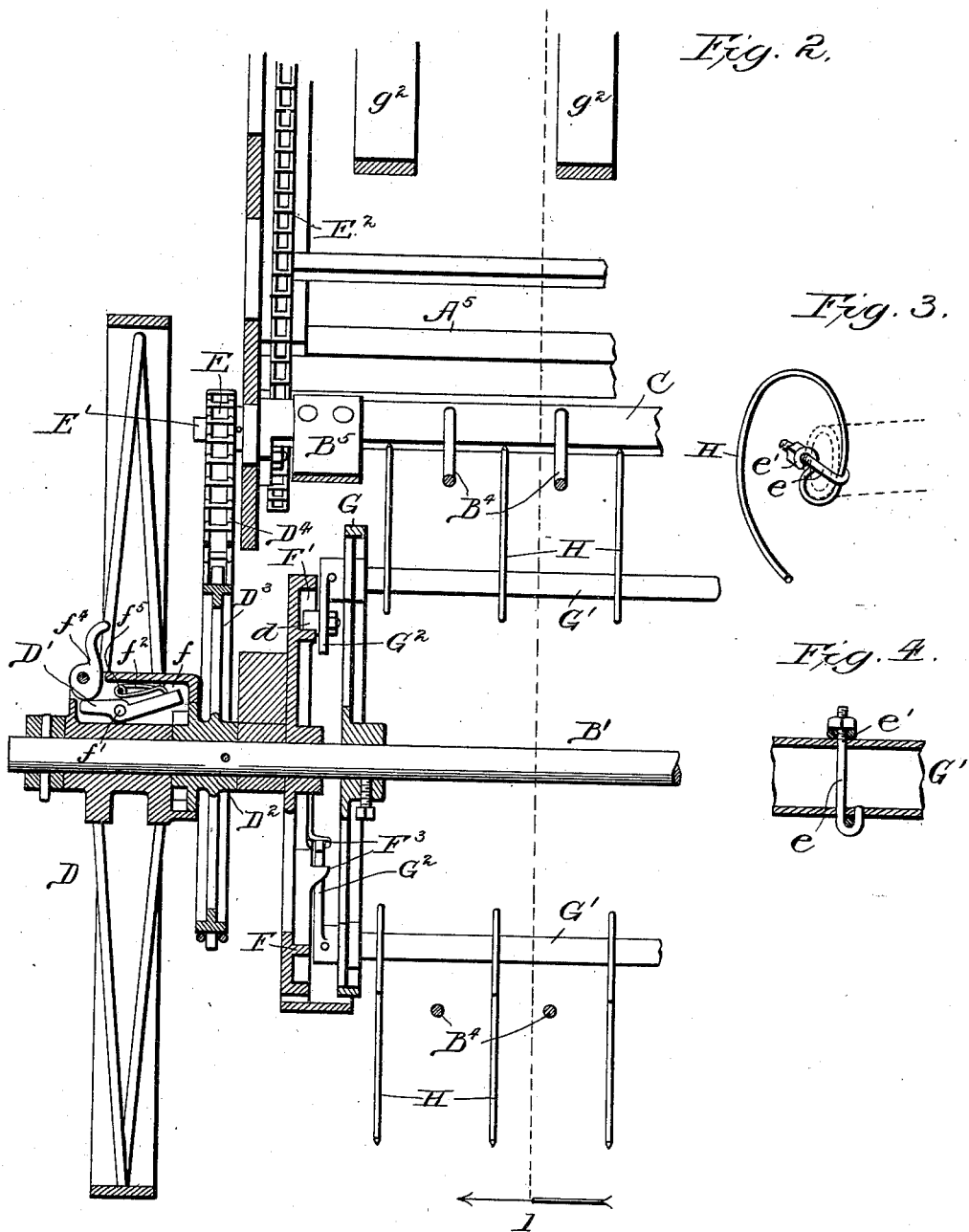
Witnesses:
D. W. Lee
A. D. Bacu
Inventor:
William H. Beckwith,
By Dyrenforth, Dyrenforth & Lee,
Att'ys.

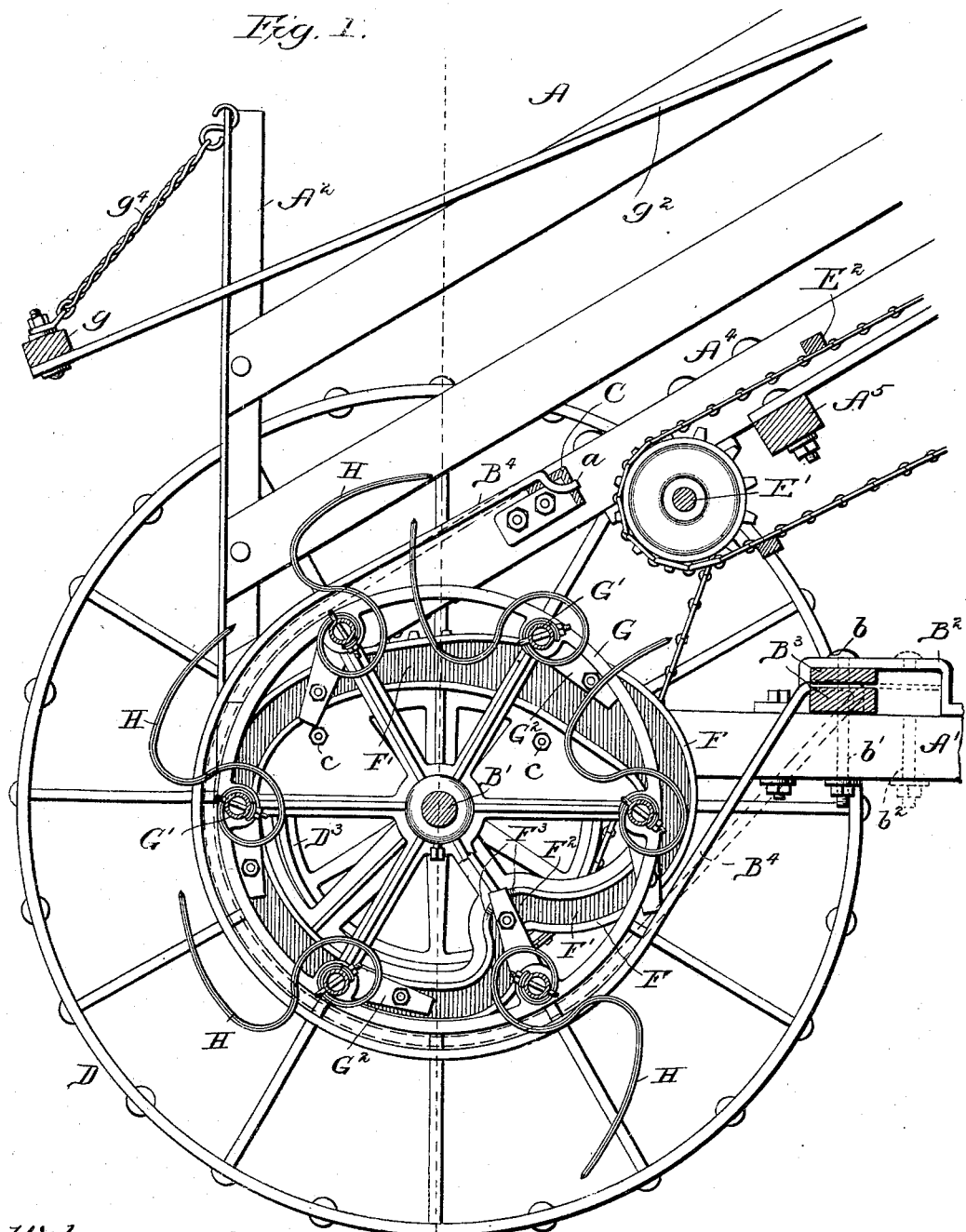

No. 668,369. Patented Feb. 19, 1901.
W. H. BECKWITH.
HAY LOADER.
(Application filed Apr. 30, 1900.)

(No Model.) 3 Sheets—Sheet 3.

Witnesses:
D. W. Lee
A. D. Bauer

Inventor:
William H. Beckwith,
By Dyrenforth, Dyrenforth & Lee,
Att'ys.

THE NORRIS PETERS CO., PHOTO-LITHO., WASHINGTON, D. C.

UNITED STATES PATENT OFFICE.

WILLIAM H. BECKWITH, OF CHICAGO, ILLINOIS.

HAY-LOADER.

SPECIFICATION forming part of Letters Patent No. 668,369, dated February 19, 1901.

Application filed April 30, 1900. Serial No. 14,873. (No model.)

*To all whom it may concern:*

Be it known that I, WILLIAM H. BECKWITH, a citizen of the United States, residing at Chicago, in the county of Cook and State of Illinois, have invented a new and useful Improvement in Hay-Loaders, of which the following is a specification.

My invention relates to that class of hay-loaders in which are employed a rearwardly and upwardly revolving picker-cylinder for picking up the hay from the swath and an endless slatted elevator or carrier-apron for receiving the hay from said cylinder and elevating it to the wagon.

My object is to provide certain improvements in the picker-cylinder, the teeth thereof, the guard or slotted casing containing said cylinder, the clutch device for turning the axle or shaft of the picker-cylinder, and the wind-break located above said endless elevator.

Figure 5:
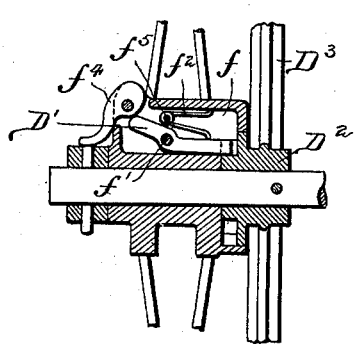
Figure 6:
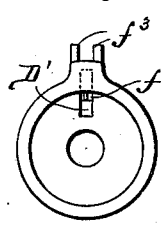
Figure 9:
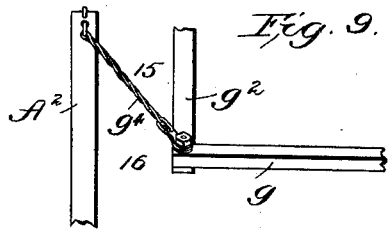
Figure 7:
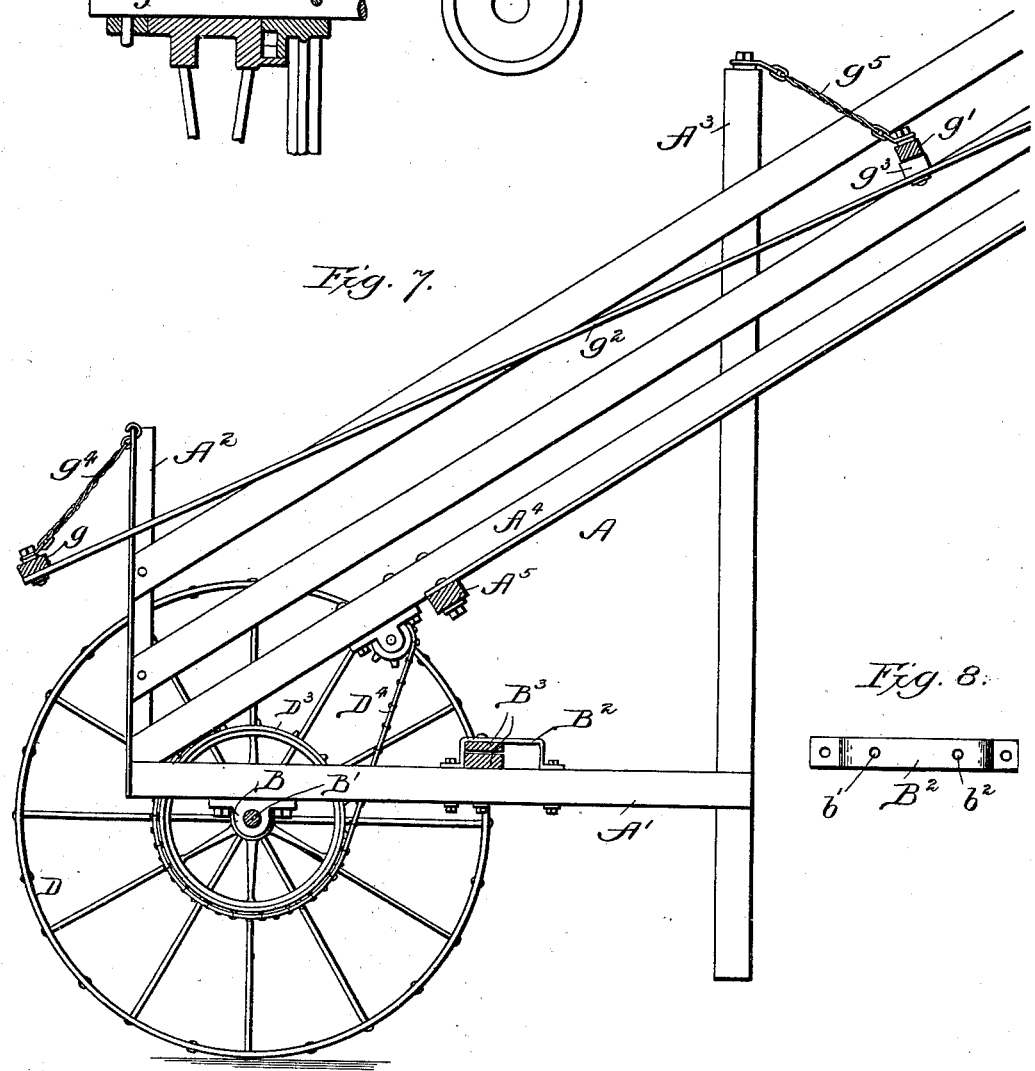
Figure 8:
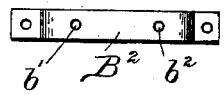

In the accompanying drawings, which illustrate my invention in connection with such parts of a hay-loader as will serve to enable a ready understanding of the features of improvement, Figure 1 is a vertical longitudinal section taken as indicated at line 1 of Fig. 2; Fig. 2, a transverse section taken as indicated at line 2 of Fig. 1; Figs. 3 and 4, details of a picker-cylinder tooth; Fig. 5, an enlarged section of the hub of a wheel, showing an improved clutch device; Fig. 6, an inner view of the hub of a wheel; Fig. 7, a vertical longitudinal section showing the manner of supporting the wind-break; Fig. 8, a detail view of a guide-plate employed in connection with the adjustable slotted picker-cylinder casing, and Fig. 9 a broken rear end view showing a wind-break connection.

A represents a frame of suitable form, which is preferably provided with horizontal base members $A'$, vertical members $A^2$ $A^3$, respectively, inclined members $A^4$, and a cross-piece $A^5$. To the members $A'$ are secured boxes B for the shaft or axle $B'$, and also guide-plates $B^2$ for receiving a double member cross-piece $B^3$, the latter serving to receive the lower ends of the guard or fender rods $B^4$, comprising the slotted casing for the picker-cylinder. To the members $A^4$ of the frame is secured an angle-iron cross-piece C for securing the upper ends of said fender-rods. The angle-iron C has one of its wings extending rearwardly at the angle of the side frame members $A^4$ and both its wings provided at proper intervals with perforations affording sockets for the offset upper ends $a$, Fig. 1, of the fender-rods. The lower ends of said rods are downturned and fit into sockets on the upper surface of the lower member of the cross-piece $B^3$, the upper member whereof acts as a clamp to securely fasten said ends, as clearly indicated in Fig. 1, where the downturned ends of the fender-rods are shown in dotted lines. Bolts $b$, passing through the guide-plates $B^2$, the ends of the members of the cross-piece $B^3$, and the frame members $A'$, serve to secure the front ends of the fender-rods against movement when desired. When it is desired to have the slotted casing containing the picker-cylinder automatically adjustable with relation to the cylinder, the bolts $b$ are omitted, in which case the members of the cross-bar $B^3$ are held together by their ends projecting beneath the guide-plates $B^2$, and said two-part cross-bar may move forward with relation to its guide-plates. Two sets of perforations are provided for the bolts $b$, as indicated at $b'$ $b^2$. Should it be desired to permanently shorten the diameter of the slotted casing, the cross-bar $B^3$ may be moved and the front set of perforations employed for the bolts $b$. Since one function of the rods $B^4$ is to press the hay against the teeth, it is clear that the capacity of the machine is increased by moving the bar $B^3$ forward. When the bolts $b$ are omitted, the elasticity of the rods $B^4$ tends to hold the bar $B^3$ at the rear end of its traverse, and if the machine is overloaded the pressure of the hay upon these rods will cause the bar $B^3$ to move forward, whence it appears that the slotted casing automatically adjusts itself to the conditions present.

In some cases it is desired to employ the machine for hours or days at its fullest capacity, as where the hay is being taken from windrows, and in such cases the cross-bar $B^3$ would be secured in its advanced position.

The axle-shaft ends project beyond their bearings and have loosely journaled upon them wheels D, provided with pawls $D'$ for engaging ratchet-equipped fixed collars $D^2$ for rotating the shaft at will. The collar shown forms the hub of a sprocket-wheel $D^3$, geared by a chain D⁴ to a sprocket-wheel E on the lower shaft E' of an endless elevator or carrier-apron E². When the pawls are released from the means shown for holding them clear from the ratchet-wheels, they engage the latter and rotate the shaft and through the medium of the sprocket-wheels and sprocket-chain also move the endless carrier-apron.

At the inner sides of the horizontal frame members A' and fixed thereto by bolts c, Fig. 1, are cams F (one being shown) of improved construction. Between the cams F and fixed to the shaft B' to rotate therewith is the picker-cylinder, shown for convenience as comprising end spiders G, joined by tubular picker-finger rock-shafts G'. The rock-shafts G' are journaled in the picker-cylinder heads or spiders G, through which their ends project, and are provided outside said heads with rigid arms G², equipped a short distance from their free ends with cam-rollers d.

The rock-shafts are equipped at proper intervals with picker fingers or teeth H of improved construction. The teeth are preferably of circular cross-section and are provided at their bases with coils which closely encircle the shafts for about half a circumference and then depart therefrom in something like evolute curves in a direction the reverse to that of the rotation of the cylinder. Each tooth is secured by a hook-ended bolt e, which passes through the shaft and through the eye e' at the base end of the tooth. Thus the hook end of the bolt clasps the coil of the tooth at one side of the shaft and the opposite end of the bolt passes through the eye at the tooth-base at the opposite side of the shaft. The hay engaging or lifting portion of each tooth is curved or bowed in a direction opposite the direction of rotation of the cylinder, the direction of curvature being reversed at the point of junction with the base-coil. The construction and mode of fastening the teeth permits the replacement of any broken tooth without dismemberment of the picker-cylinder. Wide bands B⁵ are shown as completing the slotted casing, of which the rods B⁴ form the greater part. The teeth of the picker-cylinder work between the rods and bands of the slotted casing in a well-understood manner.

The cams F are provided with slots F' of suitable form to oscillate the rock-shafts and properly guide the teeth in their independent movement as the cylinder rotates. The form of the cam-slots is such as to maintain the teeth in proper position to pick up the hay and carry it up over the cylinder to the carrier-apron E² and then allow them to tip backwardly to release the hay as the teeth retreat within the slotted casing. It will be observed that during the revolution of the cylinder a rock-shaft rotates forwardly on its axis somewhat more than three hundred and sixty degrees and then drops backwardly less than one hundred and eighty degrees, as is evident from a consideration of Fig. 1, assuming the position of the front upper rock-shaft as the starting-point. At the lower parts of the cams and in front of their centers the cam-slots are provided with reëntrant angles F², which serve to effect a quick reversal of the rock-arms. At these points the cams are provided inside the grooves F' with laterally inwardly projecting slotted lugs F³, which the extensions or projections of the rock-arms (beyond the rollers) enter at the proper instant to effect a positive reversal of the rock-arms. Without this or some equivalent means independent of the cam-grooves for insuring a reversal there would be danger of the cam-rollers continuing in advance of the rock-shaft instead of being retarded, as shown in Fig. 1. This might occur should the picker-fingers be subjected to pressure at the instant the rollers change contact from the outer to the inner guide-walls of the cam-grooves. The lower part of the divided lug prevents the rollers from being thrown back in their course on the wrong side of the reëntrant angle. At the upper portions of the cams the cam-rollers change contact from the inner guide-walls to the outer guide-walls, the inner or lower walls being there flattened or depressed to permit this movement. The slots are widened across the tops of the cams, as shown, to allow free movement to the teeth in freeing themselves from the hay. In making this change in contact a quick partial reversal of the teeth is permitted, which so changes their angles with reference to the upper portions of the guard-rods B⁴ as to permit a ready withdrawal.

In Fig. 5 and 6 are shown details of the mechanism for throwing the picker-cylinder into and out of gear with the wheels D. Each wheel-hub is provided with a chamber f, which receives the pawl D', pivoted at f', and also a spring f², bearing on said pawl. Each hub is further provided with a slotted lug f³, which receives a pivoted eccentric or cam f⁴. The outer end of the pawl f' is at an angle to the inner end thereof and engages the cam-surface of the device f⁴. By swinging the arm of the cam upwardly the outer end of the pawl D' is depressed and the inner end raised to clear the ratchet-wheel on the collar D², as shown in Fig. 2. The spring for the pawl is preferably of the form shown, being secured at its center by a pin f⁵, and having two arms projecting from said pin and provided with oppositely-turned ends which engage, respectively, the outer wall of the chamber f and the upper surface of the inner end of the pawl D'. The ratchet-wheel permits the pawl D' to ride over the ratchet-teeth in one direction in the usual manner.

In Fig. 7 is shown an improved device, commonly known as a "wind-break," for holding the hay down upon the carrier-apron E². The device comprises cross-pieces g g', longitudinal slats g², blocks g³, separating the cross-piece g' from the slats g², and chains g⁴ g⁵, suspending the frame thus described from the uprights $A^2$ $A^3$. The manner of suspension is such that the chains $g^4$ incline rearwardly, inwardly, and downwardly and the chains $g^5$ incline forwardly, inwardly, and downwardly. The effect is to hold the windbreak securely out of contact with the side frames and in its proper longitudinal position, while at the same time permitting absolute freedom of movement in adjusting itself to the quantity of hay passing beneath it; also, the rear end of the wind-break is located far enough back to insure the hay passing properly beneath it before being released from the picker-cylinder teeth. The purpose of the blocks $g^3$ is to elevate the cross-piece $g'$, so as to bridge the spaces between the slats $g^2$ at a distance above said slats, whereby an arch is afforded between each set of slats, permitting the hay to pass freely.

The general mode of operation of a machine of this character is too well understood to require further description. The value of the means inside (on a less radius than) the cam-grooves for effecting a positive reversal of the rock-arms is evident, and the manner of operation thereof is clear from the description given.

The machine described may be used, if desired, in combination with a rake for gathering up and confining the hay in the rear of the picker-cylinder in a manner well understood in the art.

Changes in the matter of minor details may be made without departure from my invention.

What I claim as new, and desire to secure by Letters Patent, is—

1. In a hay-loader, the combination with the frame, an endless elevator-carrier, and a rotating picker-cylinder, comprising cylindrically-arranged suitably-supported tooth-equipped rock-shafts provided with rock-arms equipped with cam-engaging means, of a cam provided with a cam-slot for regulating the movement of said rock-shafts and with independent means for engaging said rock-arms to give a positive reverse thereto, substantially as and for the purpose set forth.

2. In a hay-loader, the combination with the frame, an endless elevator-carrier, and a rotating picker-cylinder, comprising suitably-supported tooth-equipped rock-shafts provided with rock-arms equipped with cam-rollers, of a cam provided with a cam-slot for regulating the movement of said rock-arms and with a lug for engaging said arms to give a positive reverse thereto, substantially as and for the purpose set forth.

3. In a hay-loader, the combination with the frame, an endless elevator-carrier, and a rotating picker-cylinder, comprising suitably-supported tooth-equipped rock-shafts provided with rock-arms equipped with cam-engaging means and with extensions beyond said cam-engaging means, of a cam provided with a cam-slot for regulating the movement of said arms and with a lug for engaging said extensions to give a positive reverse to said arms, substantially as and for the purpose set forth.

4. In a hay-loader, the combination with the frame, an endless elevator-carrier, and a rotating picker-cylinder, comprising suitably-supported tooth-equipped rock-shafts provided with rock-arms equipped with cam-engaging means and with extensions beyond said cam-engaging means, of a cam provided with a cam-slot for regulating the movement of said arms and with a recessed lug for receiving said extensions and positively reversing said arms, substantially as and for the purpose set forth.

5. In a hay-loader, the combination of frame, endless elevator-carrier, rotating picker-cylinder, rock-shafts journaled therein, picker-fingers fixed thereto, rock-arms on said rock-shafts equipped with cam-rollers and provided with extensions beyond said rollers, a cam provided with a cam-groove having a reëntrant angle at its lower portion, and a lug at said reëntrant angle for engaging said arm extensions, substantially as and for the purpose set forth.

6. In a hay-loader, the combination with a suitable frame, a rotating picker-cylinder provided with rock-shafts, and means for controlling the independent movements of said rock-shafts, of picker-fingers on said shafts provided at their bases with coils encircling the shafts and adjacent to the shafts with eyes, and hook-bolts, each engaging a coil at one side of the shaft and passing through one of said eyes at the opposite side of the shaft, substantially as and for the purpose set forth.

7. In a hay-loader, the combination with the frame, an endless elevator-carrier, and a rotating picker-cylinder, comprising suitably-supported tooth-equipped rock-shafts provided with rock-arms equipped with cam-engaging means, of a cam provided with a cam-slot having its inner wall depressed at its upper portion to widen the slot and permit said cam-engaging means to change contact from the inner guide-wall to the outer guide-wall to permit a partial reversal and freedom of movement of the teeth in disengaging themselves from the hay, substantially as and for the purpose set forth.

8. In a hay-loader, the combination with a suitable frame and rotating picker-cylinder provided with picker-fingers, of an angle-iron cross-bar having a rearwardly and downwardly inclined wing and a forwardly and downwardly inclined wing and provided at said wings with perforations, fender-rods provided at their upper ends with offset extremities, each passing through a perforation of said first-named wing and into a perforation of said second-named wing, and means for securing the lower ends of said fender-rods, substantially as and for the purpose set forth.

9. In a hay-loader, the combination with a suitable frame, a rotating picker-cylinder provided with rock-shafts, and means for controlling the independent movements of said rock-shafts, of picker-fingers on said rock-shaft, each comprising a base-coil which closely encircles the shaft for substantially a half-circumference and then departs from the shaft in a widening curve and then changes its direction of curvature to produce a hay-engaging portion bowed in a direction opposite the direction of rotation of the cylinder, and means for securing the bases of the teeth to the shafts, said teeth being detachable from the rock-shafts without dismembering the cylinder, substantially as and for the purpose set forth.

10. In a hay-loader, the combination with the frame, an endless elevator-carrier and a rotating picker-cylinder provided with curved teeth for taking the hay from the ground, of an automatically-adjustable slotted casing for said picker-cylinder through which the teeth of the picker-cylinder project, said casing extending beneath said cylinder and receiving the pressure of hay on its outer surface, substantially as and for the purpose set forth.

11. In a hay-loader, the combination with the frame, an endless elevator-carrier and a rotating picker-cylinder provided with teeth for taking the hay from the ground, of a slotted casing for said picker-cylinder through which the teeth of said cylinder project, and guides on the frame of the machine connected with the front end of said slotted casing and permitting adjustment of said casing, substantially as and for the purpose set forth.

12. In a hay-loader, the combination with the frame, an endless elevator-carrier and a rotating picker-cylinder provided with teeth for taking the hay from the ground, of a slotted casing for said picker-cylinder comprising rods secured at their upper ends to a cross-bar of the frame, and at their lower ends to an adjustable cross-bar, and guides on the frame receiving the ends of said adjustable cross-bar, substantially as and for the purpose set forth.

13. In a hay-holder, the combination with the frame, a picker-cylinder shaft journaled in said frame, a picker-cylinder carried thereby, wheels on the ends of said shaft, a hub for one of said wheels having a chamber $f$ and provided at its inner end with a ratchet-receiving recess, a pawl $D'$ housed in said chamber $f$ and disposed substantially parallel to the shaft, a spring confined between said pawl and the outer wall of said chamber, a cam at the outer end of said hub engaging the outer end of said pawl, and a ratchet housed in the recess at the inner end of said hub and secured to said shaft and receiving the inner end of said pawl, substantially as and for the purpose set forth.

14. In a hay-loader, the combination with the frame, an endless elevator-carrier and a rotating picker-cylinder arranged to convey the hay to said carrier, of a wind-break located above said endless elevator, comprising a suitable frame, and chains attached to said wind-break and to the main frame of the machine, the rear set of chains being inclined rearwardly and downwardly and the front set of chains being inclined downwardly and forwardly, substantially as and for the purpose set forth.

15. In a hay-loader, the combination with the frame, an endless elevator-carrier and a rotating picker-cylinder arranged to convey the hay to said carrier, of a wind-break located above said endless elevator, comprising a suitable frame, and chains attached to said wind-break and to the main frame of the machine, one set of chains having its members inclined rearwardly, downwardly and inwardly, and the other set of chains having its members inclined forwardly, downwardly and inwardly, substantially as and for the purpose set forth.

WILLIAM H. BECKWITH.

In presence of—
D. W. LEE,
A. D. BACCI.